(12) United States Patent
Signori

(10) Patent No.: US 9,491,052 B2
(45) Date of Patent: Nov. 8, 2016

(54) TOPOLOGY AWARE SMART MERGE

(75) Inventor: David Signori, McLean, VA (US)

(73) Assignee: BLADELOGIC, INC., Houston, TX (US)

(*) Notice: Subject to any disclaimer, the term of this patent is extended or adjusted under 35 U.S.C. 154(b) by 1002 days.

(21) Appl. No.: 12/939,857

(22) Filed: Nov. 4, 2010

(65) Prior Publication Data

US 2011/0238805 A1 Sep. 29, 2011

Related U.S. Application Data

(60) Provisional application No. 61/318,166, filed on Mar. 26, 2010.

(51) Int. Cl.
*G06F 15/177* (2006.01)
*H04L 12/24* (2006.01)
*H04N 7/14* (2006.01)
*H04L 29/06* (2006.01)

(52) U.S. Cl.
CPC ....... *H04L 41/0873* (2013.01); *H04L 41/0816* (2013.01); *H04L 65/403* (2013.01); *H04N 7/147* (2013.01)

(58) Field of Classification Search
CPC ........... H04L 41/0873; H04L 41/0816; H04L 65/403; H04N 7/147
USPC .................................................. 709/220, 223
See application file for complete search history.

(56) References Cited

U.S. PATENT DOCUMENTS

| | | | |
|---|---|---|---|
| 5,751,967 A | 5/1998 | Raab et al. | |
| 5,872,928 A | 2/1999 | Lewis et al. | |
| 5,968,176 A | 10/1999 | Nessett et al. | |
| 6,477,572 B1 | 11/2002 | Elderton et al. | |
| 6,615,218 B2 | 9/2003 | Mandal et al. | |
| 6,959,332 B1* | 10/2005 | Zavalkovsky et al. | 709/223 |
| 7,143,283 B1 | 11/2006 | Chen et al. | |
| 7,308,706 B2 | 12/2007 | Markham et al. | |
| 7,505,463 B2 | 3/2009 | Schuba et al. | |
| 7,526,541 B2 | 4/2009 | Roese et al. | |
| 7,565,416 B1 | 7/2009 | Shafer et al. | |
| 7,685,316 B2* | 3/2010 | Sukumaran | 709/246 |
| 7,710,900 B2* | 5/2010 | Andrews et al. | 370/254 |
| 2003/0037040 A1 | 2/2003 | Beadles et al. | |
| 2004/0215650 A1 | 10/2004 | Shaji et al. | |
| 2008/0052757 A1* | 2/2008 | Gulati et al. | 726/1 |
| 2008/0301765 A1* | 12/2008 | Nicol | H04L 41/142 726/1 |
| 2009/0319531 A1* | 12/2009 | Ko et al. | 707/10 |
| 2010/0005505 A1 | 1/2010 | Gottimukkala et al. | |

* cited by examiner

*Primary Examiner* — Chris Parry
*Assistant Examiner* — Weiwei Stiltner

(57) ABSTRACT

Systems, methods, and computer readable media for managing the configuration of topologically related network devices are described. In general, devices that are "topologically related" are devices that are functionally coupled in some way (e.g., network switches sharing a common trunk line or network routers providing common router services in accordance with an established priority scheme). Specifically, techniques are disclosed for verifying or changing the configuration of a first network device based on the configuration of a second, topologically related, network device. Configuration policies (or rules) are described that are used to "bridge" the configuration of one device with that of another device.

10 Claims, 14 Drawing Sheets

308

GRAMMAR:

The subject line speed ${PEER} appears exactly once with no other lines containing the pattern speed * within each domain interface block containing the line switchport mode where the domain block appears any number of times within the configuration.

BINDING:

All switch trunk pairs.

FIG. 3C

312 interface FastEthernet0/1 no speed 100 speed 10 exit

316

```
...
interface FastEthernet0/0 speed 100
!
interface FastEthernet0/1 speed 10 switchport mode trunk
!
...
```

GRAMMAR:

The subject line standby 1 priority ${PEER=[105,100]} appears exactly once with no other lines containing the pattern standby 1 priority * within each domain interface block containing the line standby 1 ip where the domain block appears any number of times within the configuration.

BINDING:

All HSRP router pairs.

412 interface FastEthernet0/1 no standy 1 priority 115 standy 1 priority 105 exit

416

. . . ---------------------------------- interface Serial1/0 ip address 192.168.1.9 255.255.255.248
!
interface FastEthernet0/0 ip address 192.168.1.2  255.255.255.248 standby 1 ip 192.168.1.4 standby 1 preempt standby 1 priority 105 standby 1 track s1/0 10
!

. . . ----------------------------------

GRAMMAR:

The subject line ip address 10.1.1.[0-9] + 255.255.255.0 does not appear within each domain vlan block except 1 and 3 where the domain block appears any number of times within the configuration.

BINDING:

All layer 3 IOS network switches with vlans in the 10.1.1.0/24 subnet.

TOPOLOGY AWARE SMART MERGE

This application claims priority to U.S. provisional patent application 61/318,166, entitled "Topology Aware Smart Merge," filed Mar. 26, 2010 and which is hereby incorporated by reference.

BACKGROUND

In today's network infrastructures, hundreds or thousands of disparate devices can be scattered across remote locations that span several continents. As networks have grown, so too has the complexity of their management. To address this complexity, the field of configuration management has developed. In general, configuration management refers to the activities, methods, procedures, and tools that improve the ability of an organization to deliver quality information technology (IT) services in an economical and effective manner. Configuration management includes, among other aspects, the ability to monitor and update or change configuration parameters in various network devices.

By way of example, consider the situation where several network switches are coupled via a common network. If the administrator of such a network wanted to ensure that each switch pair operating on a common trunk were using the same speed settings, she would need to (1) manually determine which switch interface ports were connected to each other via the trunk; (2) manually examine each pair of related switch configurations to determine if a speed mismatch existed and, if a mismatch were detected, (3) update the configuration of one or more of the switches. This latter act may typically be accomplished via a command script executed against the device(s) whose configuration is being updated.

In complex environments where the number of devices being managed is large and/or where the functional interconnectivity between different devices is high, the level of effort required to perform this type of analysis renders, for all intents and purposes, such actions impossible. The consequence is that such networks are inefficiently (at best) or incompletely (as is common) managed. It would be beneficial, therefore, to provide methods, systems and computer readable media that allow the automatic configuration of functionally related devices in a network infrastructure.

SUMMARY

In general, methods, devices, networks and computer readable media to identify and update the configuration of a first network device based on the configuration of a topologically related network device are described. In one embodiment, a method can include receiving or obtaining a configuration policy (or rule) that identifies both the scope of topologically related network devices and one or more specific configuration parameters. Once obtained, the configuration policy may be used to identify specific first and second network devices that are topologically related. This may be accomplished through use of a topology data store (e.g., a database). Configuration data for the second network device may then be obtained (directly from the device or from another source) and, if found to violate the configuration policy, a command (e.g., a script) may be generated and forwarded to the second network device so that its configuration may be updated to comport with the configuration policy. The second network device may be found to violate the configuration policy if, for example, the value for one (or more) of its configuration parameters is outside a set of values specified in the configuration policy or if it is not in accordance with the corresponding value of the first (topologically related) network device.

In another embodiment, a disclosed topologically-based configuration management process begins, as above, by identifying a configuration policy. Using the configuration policy and, for example, a topology database, a plurality of topologically related network devices relevant to the configuration policy are identified. Each identified network device's configuration may then be examined to determine if it comports with, or is in violation of, the configuration policy. If a violation is detected, an indication of the violation may be recorded (e.g., written to a log file or database).

Other disclosed implementations include systems, networks and computer readable media (e.g., a program storage device) for embodying various ones or combinations of described methods.

BRIEF DESCRIPTION OF THE DRAWINGS

FIGS. 3A-3D show an illustrative infrastructure, configuration data, policy and command script in accordance with one embodiment.

FIGS. 4A-4C show illustrative configuration data, policy and command script in accordance with another embodiment.

FIGS. 6A-6C show an illustrative infrastructure, configuration data, policy and command script in accordance with still another embodiment.

DETAILED DESCRIPTION

This disclosure pertains to systems, methods, networks and computer readable media for managing the configuration of topologically related network devices in an automated/rule-based manner. As used herein, devices on a network are "topologically related" if they work together in some way (e.g., network switches sharing a common trunk line or network routers providing common router services in accordance with an established priority scheme). In general, techniques are disclosed herein for verifying or changing the configuration of a first device in accordance with a specified configuration rule/policy, determining if a second device exists that is topologically related to the first and checking/modifying the second device's configuration in accordance with the specified policy.

In the following description, for purposes of explanation, numerous specific details are set forth in order to provide a thorough understanding of the inventive concept. As part of the this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment"

or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the image processing field having the benefit of this disclosure.

Figure 1A:
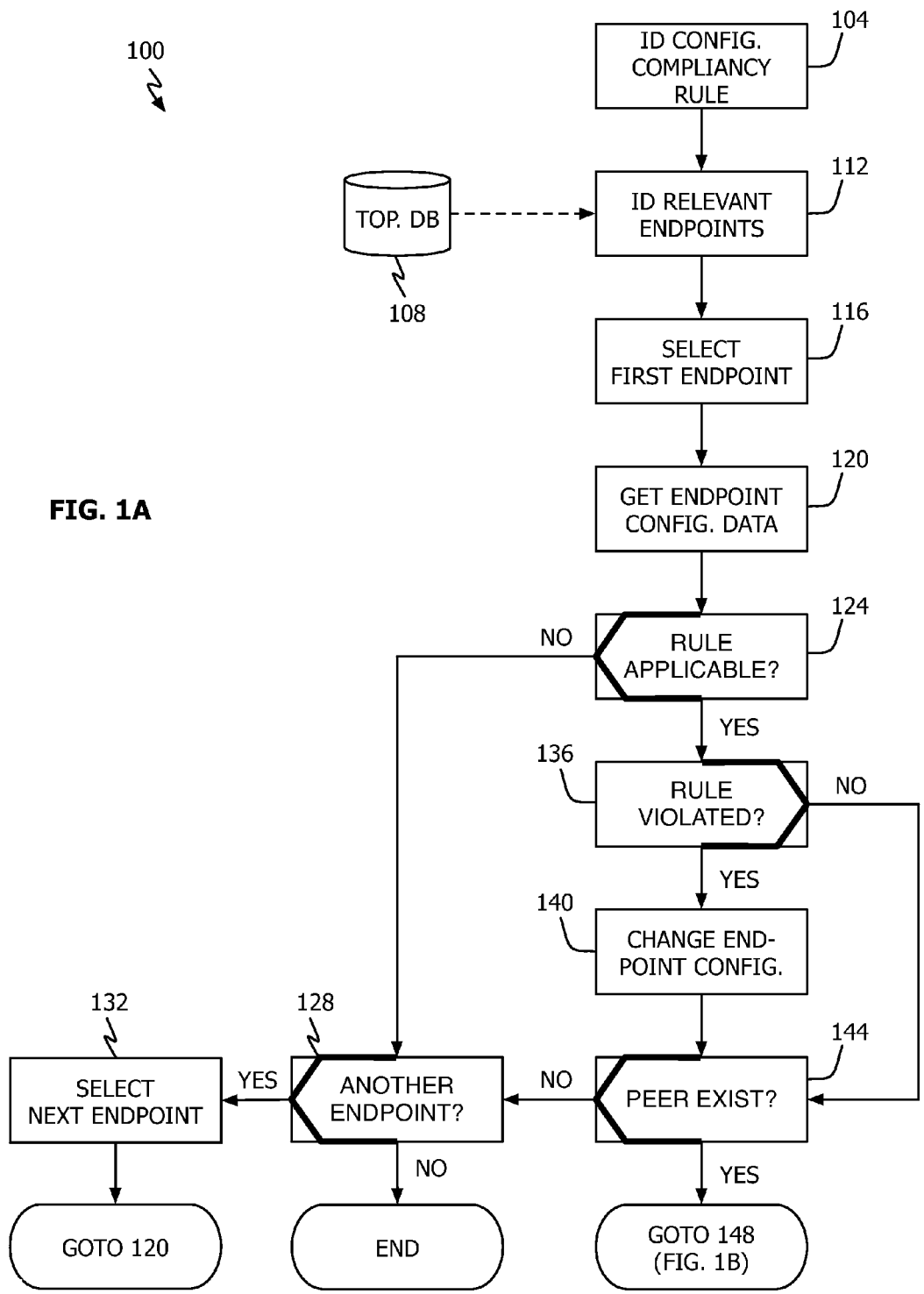
FIGS. 1A-1C show, in flowchart format, a topology aware configuration management operation in accordance with one embodiment.

Referring to FIG. 1A, topology aware configuration management operation 100 in accordance with one embodiment begins when a configuration compliancy policy is identified for evaluation (block 104). For example, a system administrator may select a policy whose purpose is to ensure that all network switch pairs coupled via a common interface are set to operate at a common speed. Alternatively, a policy in accordance with this disclosure may be configured to automatically execute at a specified time or at periodic intervals.

Policy evaluation/execution may begin by querying topological database 108 to identify all devices relevant to the policy (block 112). The collection of all such devices will, hereinafter, be referred to as the policy's "span." In general, topological database 108 represents any data store in which a network's devices and those device's functional connectivity are identified. By way of example, topological database 108 may be implemented as a relational, object-oriented or hierarchical database, or as a "flat" file organized in accordance with, for example, the eXtensible Markup Language (XML) standard. In one embodiment, topological database 108 may be a stand-alone data store. In another embodiment, topological database 108 may be incorporated within a larger database such as an organization's Configuration Management Database (CMDB) as set forth in the Information Technology Infrastructure Library (ITIL®) standard. (ITIL is a registered trademark of the Lords Commissioners of Her Majesty's Treasury, a department of the United Kingdom government.)

A first device may then be selected from the collection of devices identified in accordance with block 112 (block 116). Next, the device's configuration data is obtained (block 120). If the policy is not applicable to the first selected device (the "NO" prong of block 124), a check is made to determine if another device exists against which to evaluate the policy (i.e., from those identified in accordance with block 112). If no such device exists (the "NO" prong of block 128), topology aware configuration management operation 100 is complete. If at least one device remains to be evaluated (the "YES" prong of block 128), a next device is selected (block 132) whereafter processing continues at block 120.

If the policy is applicable to the current device (the "YES" prong of block 124), the policy is evaluated with respect to the device's configuration data. If the device's current configuration violates the policy (the "YES" prong of block 136), the device's configuration may be changed to conform to the policy (block 140). In one embodiment, acts in accordance with block 140 are performed by automatically generating a script file that can be sent to, and executed by, the target device. One of ordinary skill in the art will recognize that different devices (e.g., a Cisco network switch, a Foundry network switch, an Extreme network switch, a Juniper network switch, an HP Procurve network switch, a Cisco router, a CISCO or Juniper firewalls, and CISCO or F5 load-balancers) may require different script commands to accomplish substantially the same task. Accordingly, the syntax of any script generated in accordance with block 140 may be dependent upon the precise device whose configuration settings are being updated.

If the current device's configuration does not violate the policy (the "NO" prong of block 136), or following acts in accordance with block 140, a check is made to determine if the current device has a peer. As used herein, two devices are "peers" if they are directly topologically related. If no peer exist (the "NO" prong of block 144), processing continues at block 128. If a peer does exist (the "YES" prong of block 144), processing continues at block 148 in FIG. 1B.

Figure 1B:
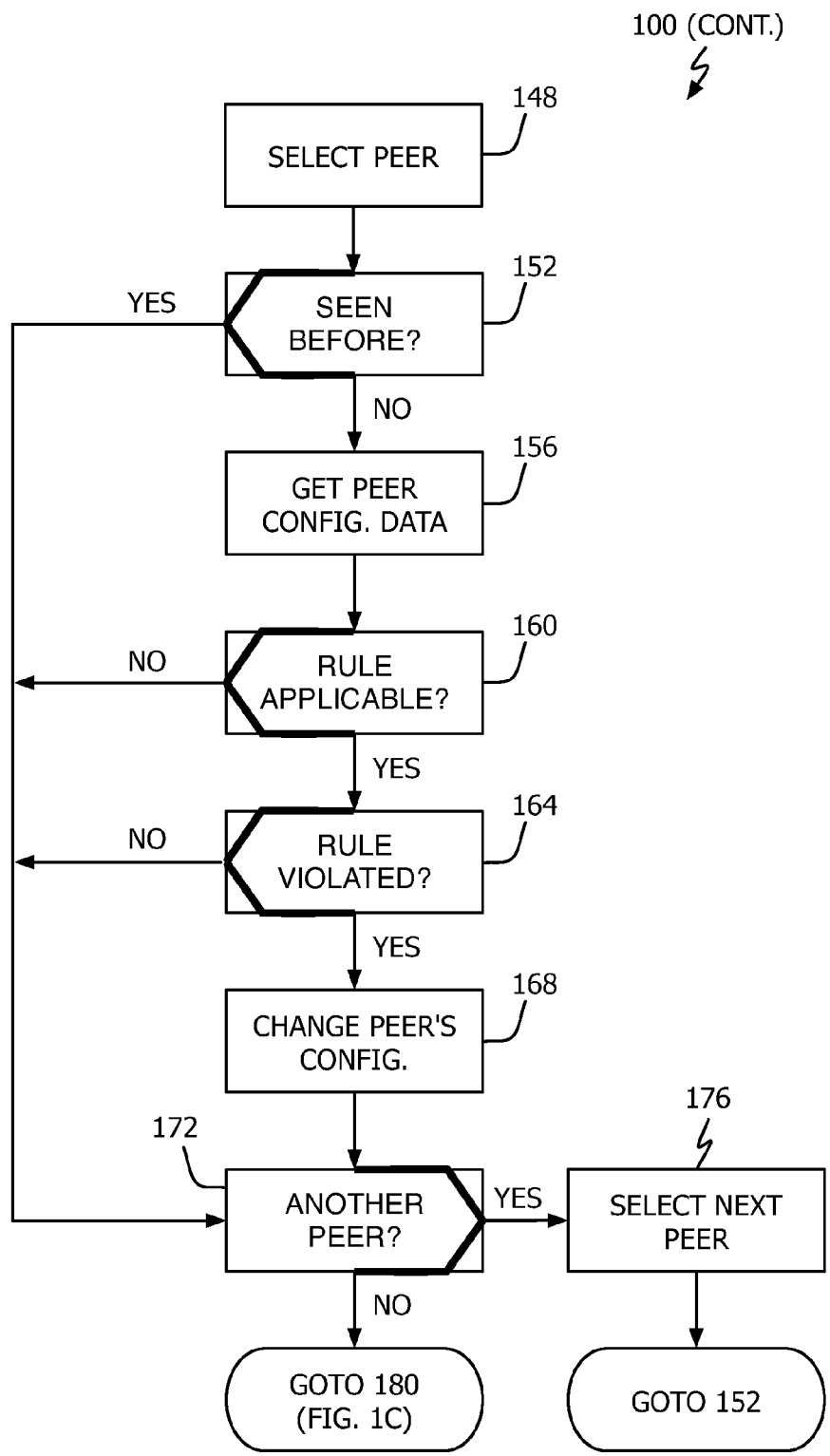

Referring to FIG. 1B, a first peer is identified from information contained in topological database 108 (block 148), whereafter a check is made to determine if the device has already been evaluated during operation 100 (152). If the current peer has not been previously identified and evaluated (the "NO" prong of block 152), the current peer's configuration data is obtained (block 156) and evaluated in light of the policy. If the policy is applicable to the current peer device (the "YES" prong of block 160), a further check is made to determine if the current peer's configuration violates the policy. If a violation is detected (the "YES" prong of block 164), the peer's configuration may be changed to conform to the policy (block 168). Acts in accordance with blocks 156-168 may be performed in the same manner as acts 120, 124, 136 and 140 respectively. If the current peer has been evaluated before (the "YES" prong of block 152), or the policy is not applicable to the current peer device (the "NO" prong of block 160), or the policy is not violated by the current peer's configuration (the "NO" prong of block 164) and following the acts of block 168, a check is made to determine if the current device has another peer (block 172). If another peer exists (the "YES" prong of block 172), a next peer device is selected (block 176), whereafter processing continues at block 152. If the current device does not have another peer device (the "NO" prong of 172), processing continues at block 180 in FIG. 1C.

Figure 1C:
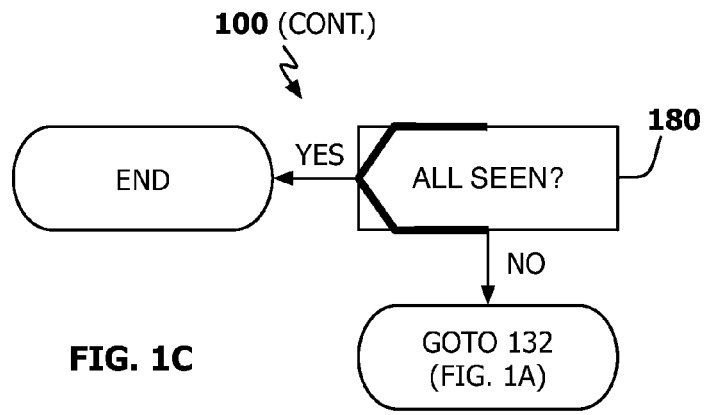

Referring to FIG. 1C, if all devices identified in accordance with block 112 have been evaluated (the "YES" prong of block 180), topology aware configuration change operation 100 is complete. If at least one device in the span of devices for the policy has yet to be evaluated (the "NO" prong of block 180), processing continues at block 132 in FIG. 1A.

It will be recognized that the configuration data for a single device may include multiple settings that may be implicated by a policy's evaluation. For example, the current device evaluated in accordance with block 124 may have multiple "blocks" against which the policy may be evaluated. Similarly, the current peer device evaluated in accordance with block 160 may also have multiple "blocks" against which a policy may be evaluated. As used herein, the term "block" refers to an operational segment or quanta of a device's configuration data. In both of these situations, each block in the respective configuration fie may be evaluated in accordance with operation 100. In one embodiment, all blocks in a peer device's configuration file may be evaluated before the multiple blocks in the current device's configuration file. In another embodiment, all blocks in the current device's configuration file may be evaluated before the multiple blocks in the current peer device's configuration file.

Figure 2:
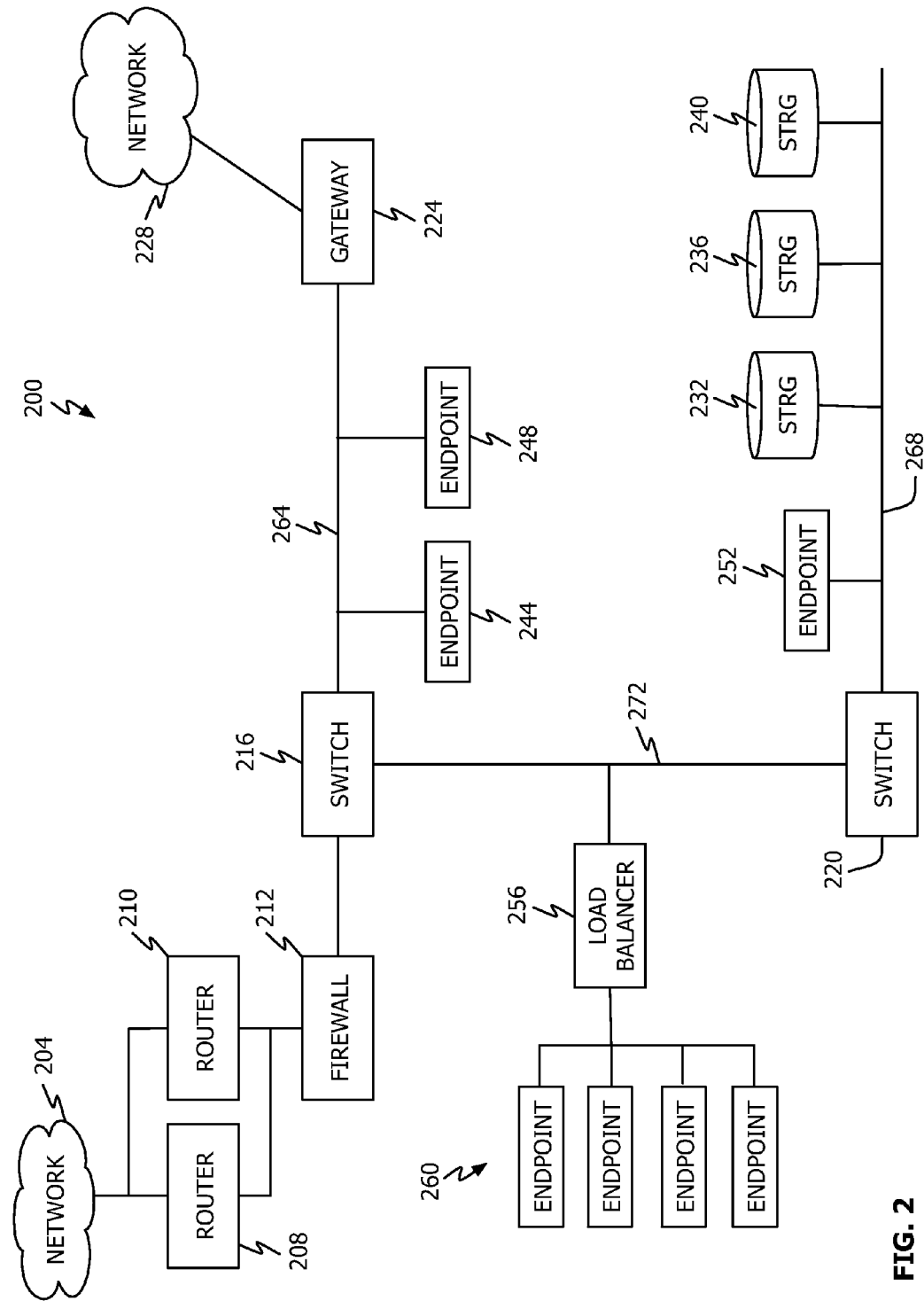
FIG. 2 shows, in block diagram format, an illustrative network infrastructure within which a topology aware configuration management operation in accordance with this disclosure may operate.

Referring to FIG. 2, illustrative environment 200 within which configuration management operation 100 may find use can include first network 204, routers 208 and 210 in a hot-standby configuration, firewall 212, network switches 216 and 220, gateway 224 to second network 228, storage devices 232-240, endpoints 244-252 (e.g., workstations, server computer systems, desktop units, portable devices) and load balancer 256 servicing additional endpoints 260. Switch 216 provides subnet 264, switch 220 provides subnet 268 and switches 216 and 220 our coupled via subnet 272. In one embodiment, operation 100 may be implemented as computer software executing on one or more of endpoints 244-252 or 260. By way of example, endpoint 244 may function as a network management station—having a processing unit that executes computer program instructions to provide, inter alia, the functionality described above with respect to FIG. 1.

To illustrate the principles outlined in FIG. 1, three use-cases will be presented. In a first example, each network switch sharing a common interface on the same network trunk will be configured to use the same speed settings. In a second example, all router pairs that share a gateway virtual IP address will be configured to use a specified set of priority values. In a third example, all network switches whose virtual local area networks (VLANs) do not belong to one of a specified set of VLANs are identified/reported.

Figure 3A:
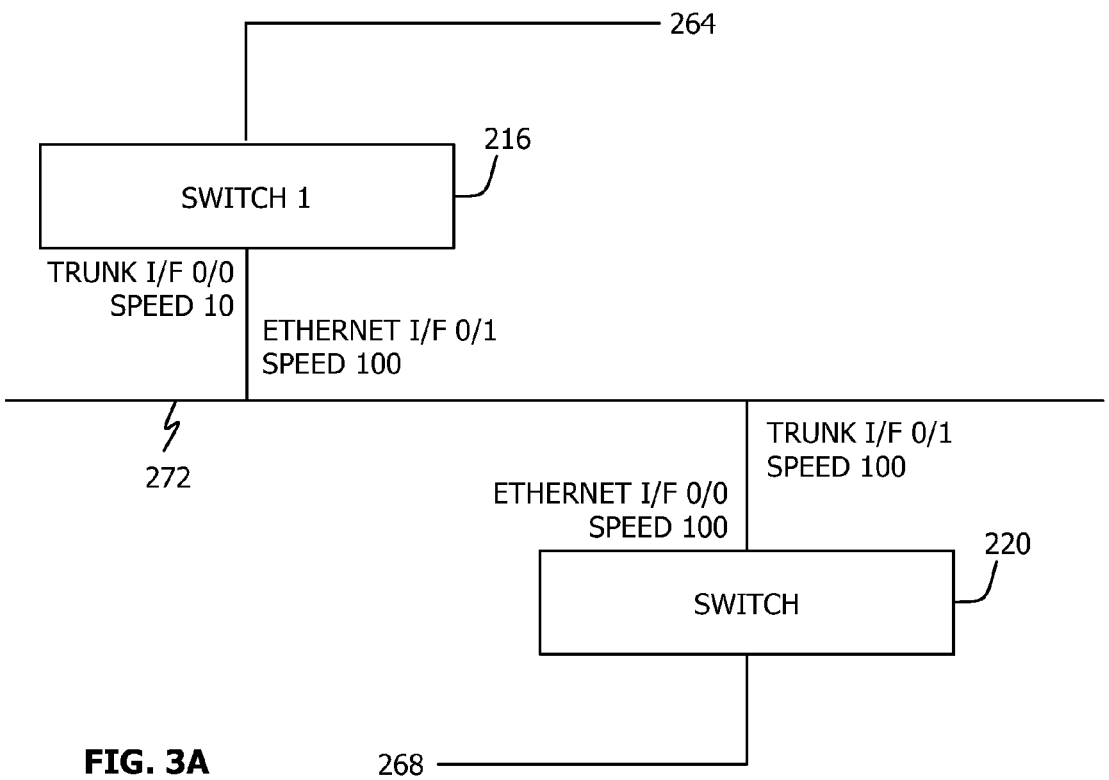
Figure 3B:
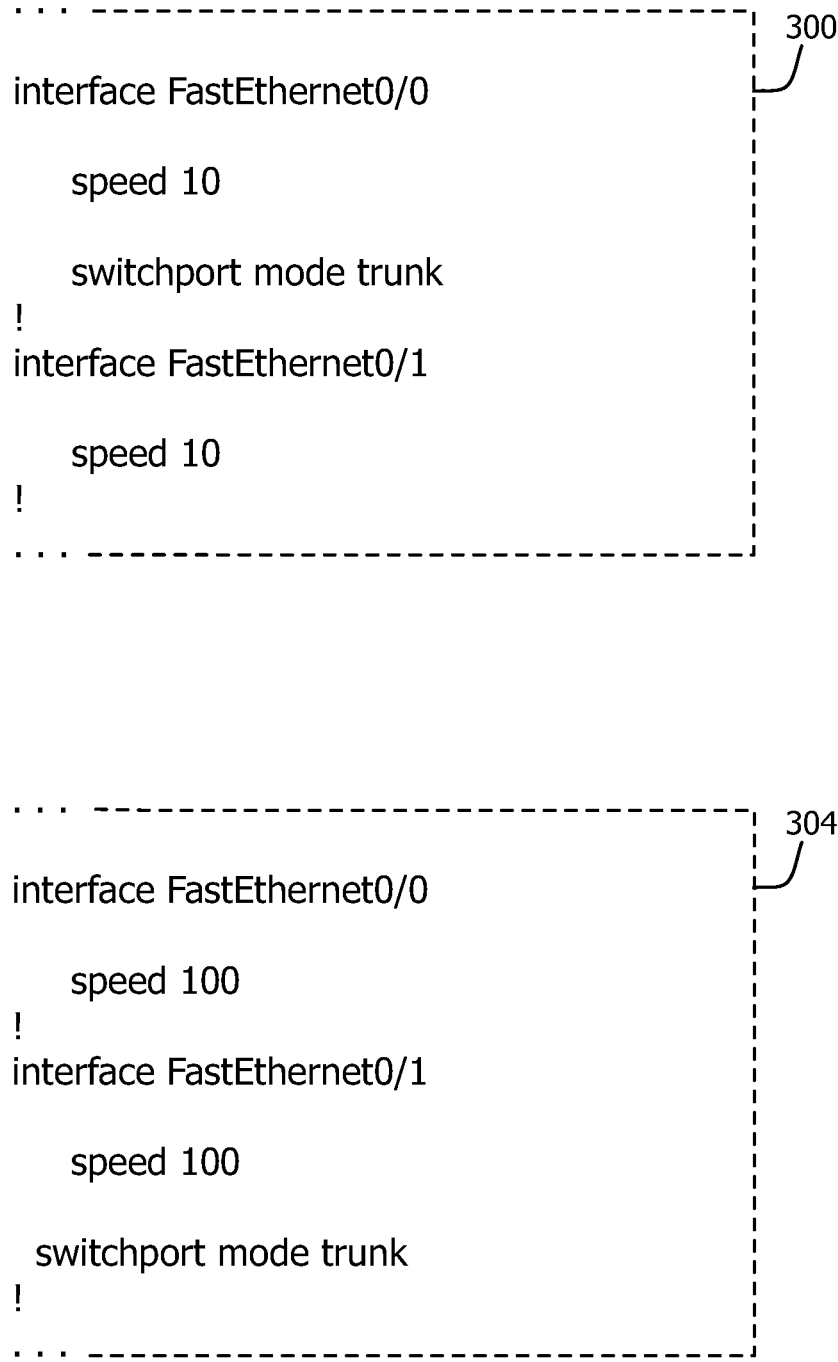

Switch Trunk Speed Enforcement Example:

Referring to FIG. 3A, a portion of network infrastructure 200 including Cisco IOS network switches 216 and 220 is shown. As illustrated, switch 216 is coupled to subnet 272 through two interfaces: trunk interface 0/0 at a speed of 10 Mbps and Ethernet interface 0/1 at a speed of 100 Mbps. Similarly, switch 220 is coupled to subnet 272 through two interfaces: Ethernet interface 0/0 at a speed of 100 Mbps and trunk interface 0/1 at a speed of 100 Mbps. FIG. 3B shows a portion of the configuration data for switches 216 (300) and 220 (304) corresponding to FIG. 3A.

Referring to FIG. 3C, illustrative policy 308 will configure switches 216 and 220 (as shown in FIG. 3A) to have the same speed on their shared trunk interface. In accordance with one embodiment, policy 308 expresses the speed setting abstractly as a parameter—${PEER}—which refers to the peer of the particular network switch being evaluated.

For purposes of this example, consider endpoint 244 executing software in accordance with operation 100 (the "system") launching policy 308 (block 104). The system examines policy 308's binding to determine that it's span is all switch trunk pairs, then consults topology database 108 to identify switches 216 and 220 (block 112). Selecting switch 216 as a first device (block 116), its configuration data 300 is obtained (block 120) and examined—finding that interface block FastEthernet0/0 contains the string or pattern "switchport mode trunk" and is, therefore a part of the domain to be evaluated (the "YES" prong of block 124). As used herein, the term "domain" means that portion of a device's configuration data that is being evaluated. In example configuration data 300 and 304, domains are represented as indented blocks of text. Thus, configuration data 300 has two (2) domains: one set-off by "interface FastEthernet0/0" and another set off by "interface FastEthernet0/1." Since only the "interface FastEthernet0/0" domain includes the pattern "switchport mode trunk" (in accordance with policy 308), only that domain is relevant to the current discussion.

Policy 308's subject may then be examined and found to reference the speed setting of the current switches (i.e., switch 216) network peer. Topological information may then be consulted to find that switch 216's network peer is switch 220. Since switch 220 has not yet been evaluated for compliancy with policy 308, the subject "speed ${PEER}" in policy 308 may be interpreted as "speed *" for switch 216. (This knowledge may, for example, be based in part on information obtained during acts in accordance with block 112.) The system then examines the configuration data in the matched domain for switch 216, matching "speed *" in policy 308 with "speed 10" in configuration data 300, thus satisfying the grammar and concluding that switch 216 is compliant with policy 308 (the "NO" prong of block 136).

Since switch 216 is known to have a peer device, switch 220 (the "YES" prong of block 144 and block 148), and that the peer device is known not to have been seen/evaluated for compliancy with policy 308 (the "NO" prong of block 152), peer switch 220's configuration data is obtained (block 156) and examined—finding that interface block FastEthernet0/1 contains the pattern "switchport mode trunk" and is, therefore a part of the domain to be evaluated (the "YES" prong of block 160). Policy 308's subject may then be examined and found to reference the speed setting of the current device's network peer. As noted previously, topological information indicates that switch 220's network peer is switch 216. Since switch 216 has already been evaluated for compliancy with policy 308, that it is associated with the interface block FastEthernet0/0 (through matching policy 308's "switchport mode trunk" line) and that its speed setting is 10, the subject "speed ${PEER} in rule 308 for switch 220 may be interpreted as "speed 10" (the speed for switch 220's network peer—switch 216). Next, each line within the identified domain in switch 220's configuration data is searched for the subject "speed 10." Since this string/pattern is not to be found in the relevant domain, switch 220 is determined to be non-compliant with policy 308 (the "YES" prong of block 164).

Upon determining that switch 220 is in violation of policy 308, the system can automatically generate a script file that can update or replace switch 220's current configuration data to conform to policy 308 (block 168). FIG. 3D shows an illustrative command script 312 for migrating Cisco IOS network switch 220's configuration from that shown in 304 to that shown as 316. Since it is known from topology database 108 that no additional peers exist (the "NO" prong of block 172) and, further, that all switches have been examined for compliance with policy 308 (the "YES" prong of block 180), operations in accordance with 100 can terminate.

It will be recognized that, while switch 216 was selected for evaluation first, this need not be the case. In addition, the implementation discussed above used the first evaluated switch's speed to set all subsequently identified peers. This too need not be the case. For example, in another embodiment the highest (lowest) speed from among the peer devices may be used. In yet another embodiment, a speed may have been specified in the policy being evaluated.

Figure 4A:
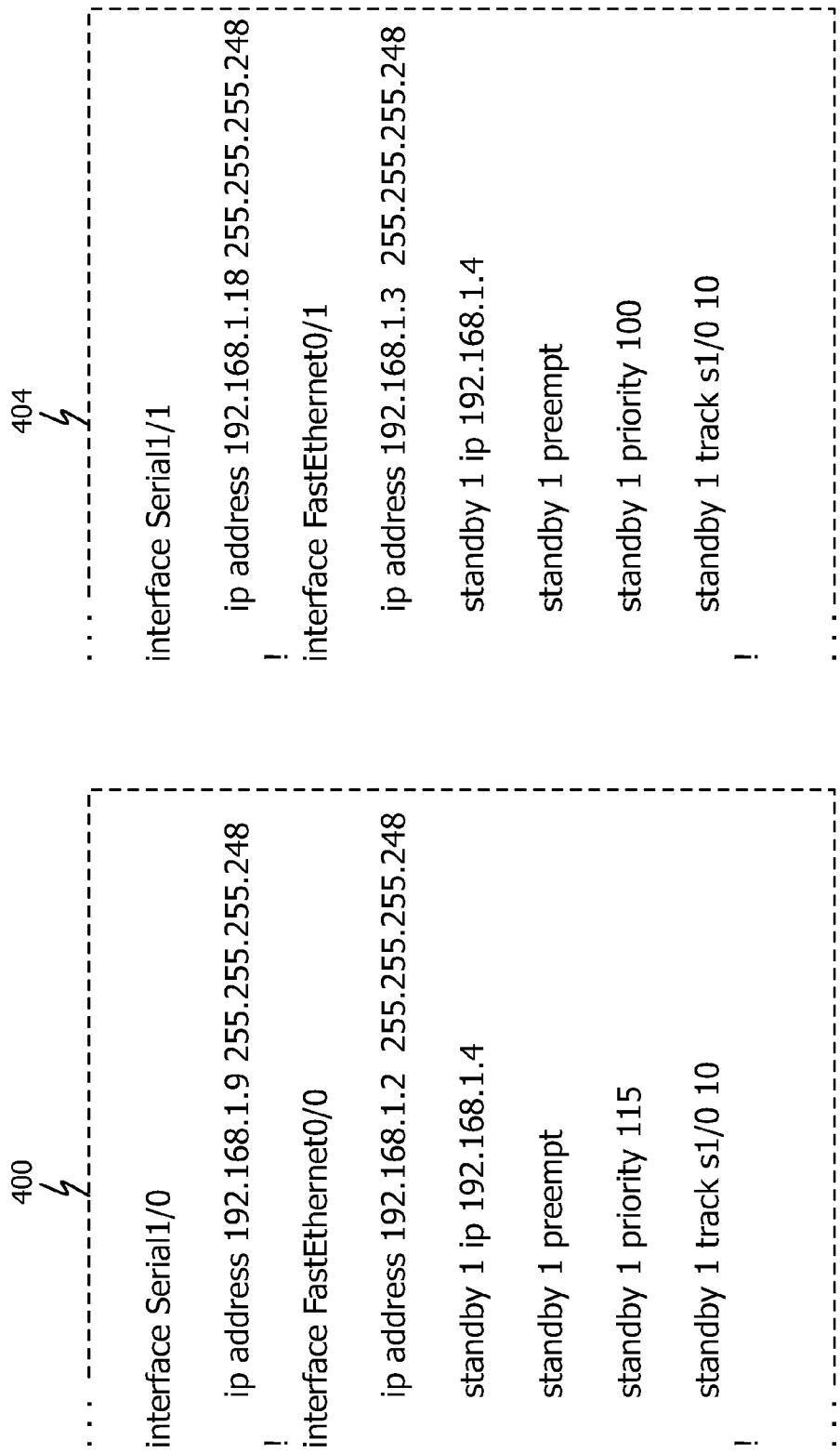

Router Hot Standby Routing Protocol (HSRP) Priority Enforcement Example:

Referring again to FIG. 2, Cisco routers 208 and 210 are shown in a hot standby configuration. In accordance with this example, all IOS HSRP pairs (e.g., routers that share a gateway virtual IP address), are made to use a specified set of priorities. FIG. 4A shows a portion of the configuration data for routers 208 (400) and 210 (404). As shown, router 208 has a standby priority of 115 and router 210 has a standby priority of 100.

Referring to FIG. 4B, illustrative policy 408 will configure routers 208 and 210 to have a standby priority of 105 or 100 exclusively. In accordance with one embodiment, policy 408 expresses the standby 1 priority setting abstractly as a parameter with a specified list of permissible values—${PEER=[105,100]}.

As in the previous example, endpoint 244 executing software in accordance with operation 100 will be referred to as the "system." Accordingly, when the system launches policy 408 (block 104), its binding is examined to determine that its span is all HSRP router pairs. Topology database 108 may then be consulted to identify routers 208 and 210 (block 112). Selecting router 208 as a first device (block 116), its configuration data is obtained (block 120) and examined—finding that interface block FastEthernet0/0 contains the pattern "standby 1 ip" in accordance with policy 408 and is, therefore a part of the domain to be evaluated (the "YES" prong of block 124). Since only the "interface FastEthernet0/0" domain includes the pattern "standby 1 ip" (in accordance with policy 408), only that domain is relevant to the current discussion.

Figure 4C:
Figure 4C:

Policy 408's subject may then be examined and found to reference the priority setting of the current router's (i.e., router 208) network peer. Topological information may then be consulted to find that router 208's network peer is router 210. Since router 210 has not yet been evaluated for compliancy with policy 408, the subject "standby 1 priority ${PEER=[105,100]}" in policy 408 may be interpreted as either "standby 1 priority 105" or "standby 1 priority 100" for router 208. (This knowledge may, for example, be based in part on information obtained during acts in accordance with block 112.) The system then examines the configuration data in the relevant domain for router 208, looking to match "standby 1 priority *" in policy 408 with either "standby 1 priority 105" or "standby 1 priority 100." Since neither of these patterns are found, it is determined that router 208 violates policy 408 (the "YES" prong of block 136). The system may then generate a command script that can update or replace router 208's configuration data 400 to conform to policy 408 (block 140)—say, by using a priority of 105. FIG. 4C shows an illustrative command script 412 for migrating Cisco router 208's configuration from that shown in 400 to that shown as 416. Since router 208 is known to have a peer device (the "YES" prong of block 144), that device is selected (block 148) and, since it has not yet been evaluated for compliance with policy 408 (the "NO" prong of block 152), it configuration data is obtained (block 156). The system may then examine router 210's configuration data 404—finding that interface block FastEthernet0/1 contains the pattern "standby 1 ip" and is, therefore a domain to be evaluated (the "YES" prong of block 160).

By examining rule 408's subject, the system can determine that it references the priority setting of the interface block of the current router's network peer. Topology database 108 may then be consulted to determine that router 210's peer is router 208. It is also known at this point that router 208 has already been evaluated for compliance with policy 408 and that policy 408's subject "standby 1 priority ${PEER=[105,100]}" has been interpreted as "standby 1 priority 105." Accordingly, the system searches configuration data 404 for router 210 for the pattern "standby 1 priority 100" (this is the only other option permitted by policy 408). Finding this pattern, the system can determine that router 210 is in compliance with policy 408 (the "NO" prong of block 164). Since, in this example, no other peer device exists (the "NO" prong of block 172) and there are no other devices to check (the "YES" prong of block 180), operation 100 exits.

It will be recognized that, while router 208 was selected for evaluation first, this need not be the case. In addition, the implementation discussed above used the first specified standby 1 priority in the list of available priorities to assign to the first non-compliant device. This too need not always be the case.

Network Switch Subnet VLAN Audit Example:

In some embodiments it is not necessary or even, perhaps, desirable to automatically update an endpoint's configuration. It may, however, be beneficial to determine when an endpoint violates a given policy and report this fact. In such cases, topology aware configuration audit operations in accordance with FIG. 5 may be implemented. As shown, topology aware configuration audit operation 500 begins when a configuration compliancy policy is identified for evaluation (block 504). As in operations in accordance with FIG. 1, policy evaluation/execution can begin by querying topological database 108 to identify all endpoints relevant to the policy (block 508). A first device may then be selected from the collection of endpoints identified in accordance with block 508 (block 512), whereafter that endpoint's configuration data is obtained (block 516). If the selected endpoint's configuration data shows non-compliance with the policy (the "YES" prong of block 520), the violation is noted (block 524). Following recordation of any detected policy violation or should the selected endpoint's configuration data not violate the policy (the "NO" prong of block 520), a check is made to determine if another endpoint remains to be checked. If no such endpoint exists (the "NO" prong of block 528), audit operation 500 terminates. If, on the other hand, at least one more endpoint remains to be checked (the "YES" prong of bock 528), that endpoint is selected (block 532), whereafter operations continue at block 516.

Figure 5:
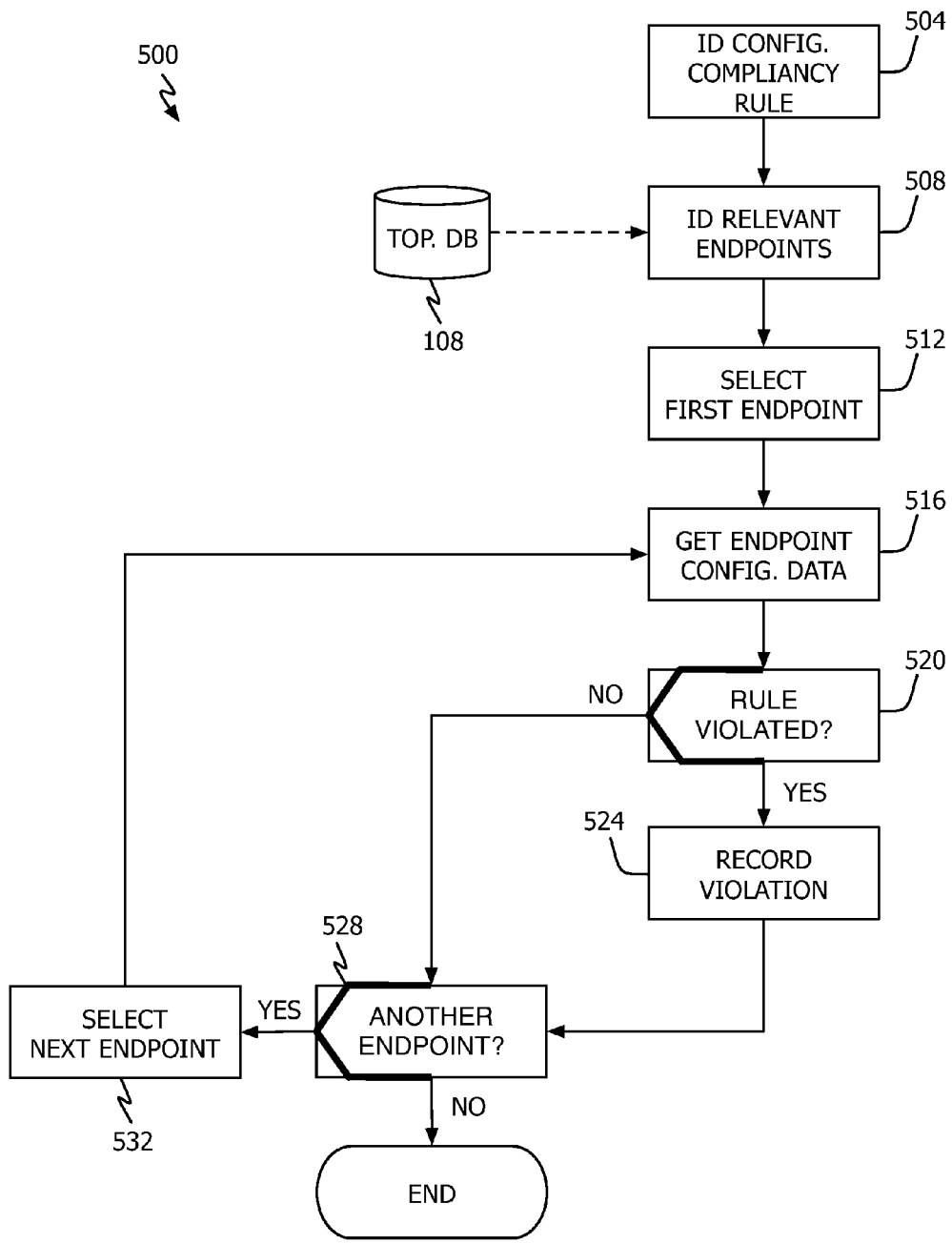
FIG. 5 shows, in flowchart format, a topology aware configuration management operation in accordance with another embodiment.
Figure 6A:
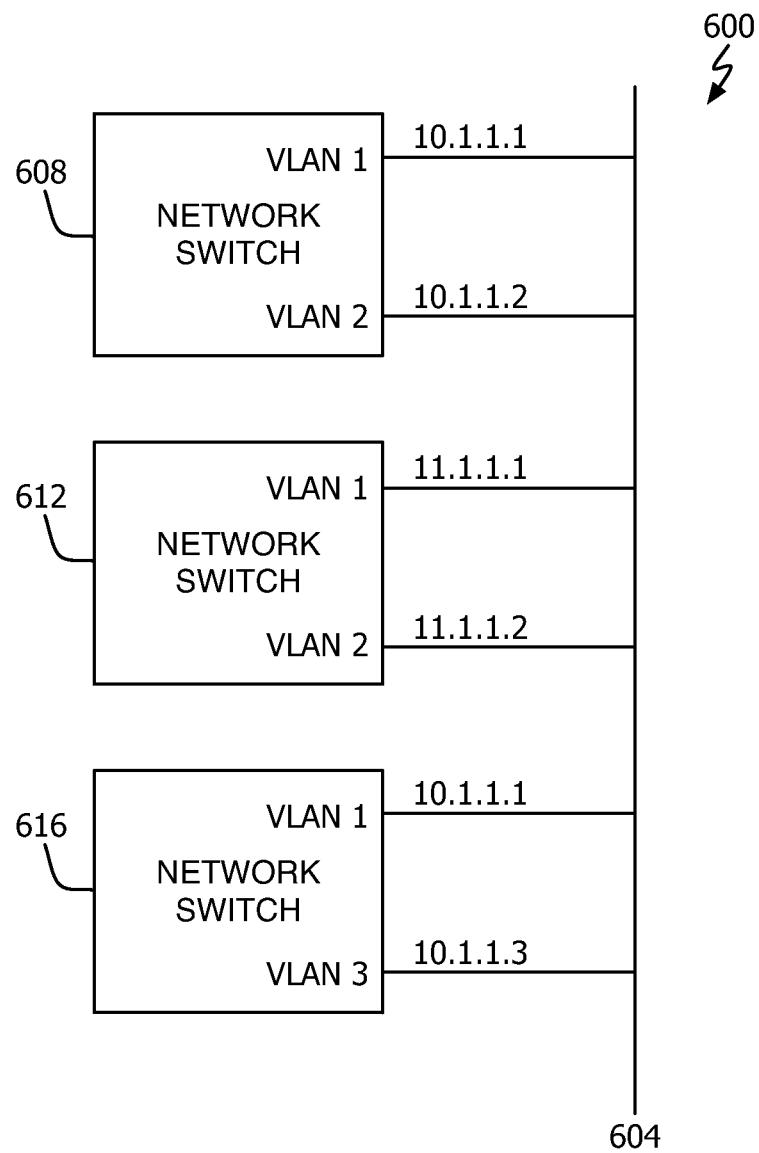
Figure 6B:
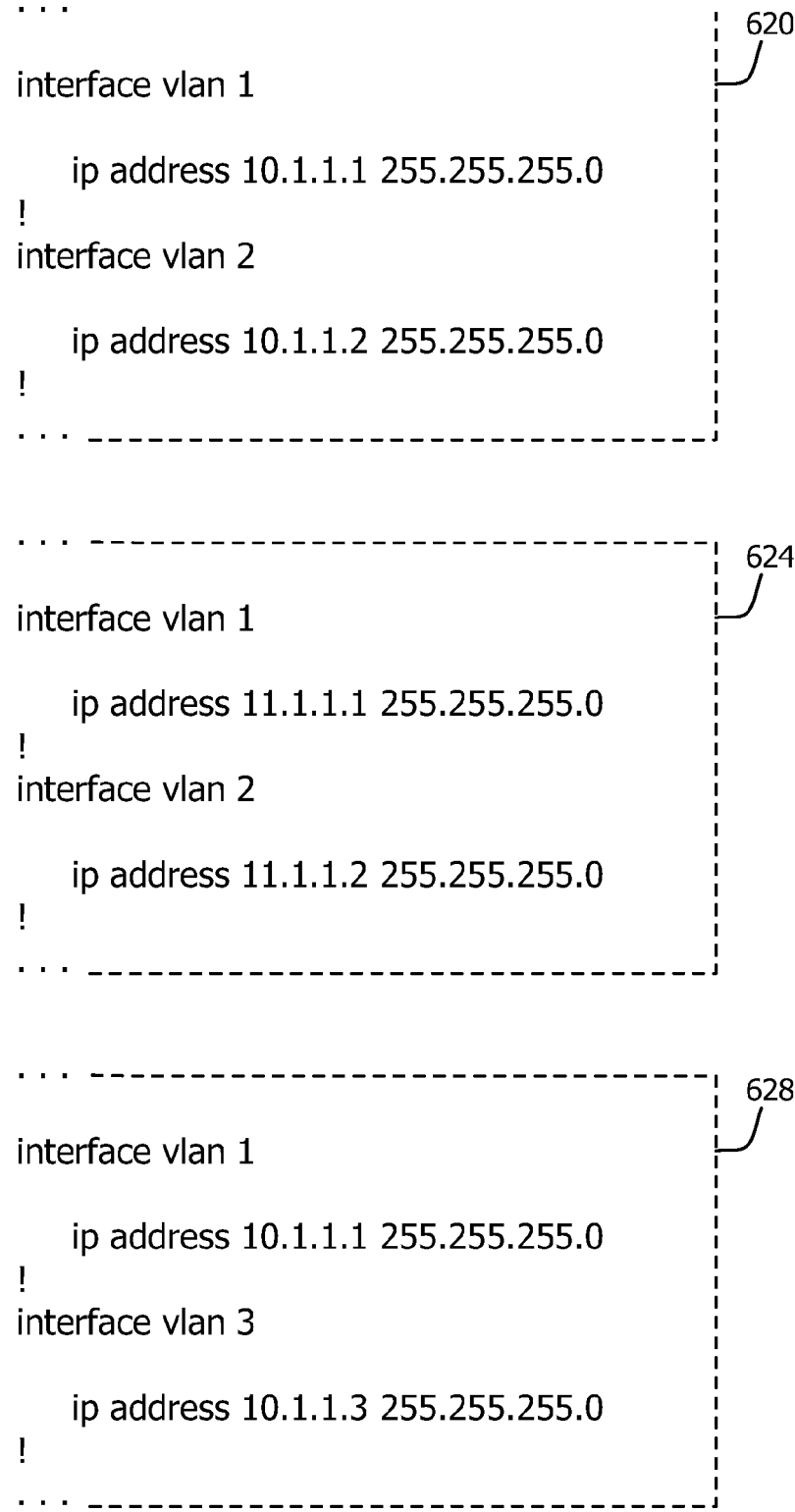

Referring to FIG. 6A, an illustrative audit operation in accordance with FIG. 5 will be applied to partial network infrastructure 600. Network 600 includes, inter alia, network backbone 604 and three layer 3 IOS network switches, 608, 612 and 616. As shown pictorially, network switch 608 has address 10.1.1.1 assigned to VLAN 1 and address 10.1.1.2 assigned to VLAN 2. Similarly, switch 612 has address 11.1.1.1 assigned to VLAN 1 and address 11.1.1.2 assigned to VLAN 2 while switch 616 has address 10.1.1.1 assigned to VLAN 1 and address 10.1.1.3 to VLAN 3. FIG. 6B shows the relevant portion of each device's configuration data 620, 624 and 628 for switches 608, 612 and 616 respectively. Referring to FIG. 6C, illustrative policy 632 audits the VLAN settings for all layer 3 IOS network switches and reports (e.g., logs or displays) all such switches in which the address range 10.1.1.0/24 subnet that do not belong to either VLAN 1 or VLAN 3.

As before, a processing element (e.g., one or more of endpoints 244, 248 or 260) executing software instructions to perform operation 500 will hereinafter be referred to as the "system." When the system launches policy 632 (block 504), its binding is examined to determine that its span is all layer 3 IOS network switches with VLANs in the 10.1.1.0/24 subnet. Topology database 108 may then be consulted to identify network switches 608 and 616 (block 508). Selecting network switch 608 as a first device (block 512), configuration data for switch 608 may be obtained (block 516). Upon examination, configuration data 620 is determined to have two (2) domains that are relevant to policy 632—one domain for "vlan 1" and another for "vlan 2." Policy 632's subject may then be examined to find that pattern "10.1.1.[0-9]+255.255.255.0" appears in both the "interface vlan 1" domain and the "interface vlan 2" domain.

Thus, network switch 608 is determined to violate policy 632 (the "YES" prong of block 520). Rather than generating a command script to update switch 608's configuration data as in operations in accordance with 600, in this embodiment the system merely records or logs the fact that switch 608 violates policy 632 (block 524).

Having competed evaluation of switch 608's configuration in accordance with policy 632, and noting that another switch remains to be evaluated (the "YES" prong of block 528), the next previously identified switch—616—is selected (block 532) and it's configuration data obtained (block 516). Since the subject/pattern "ip address 10.1.1.[0-9]+255.255.255.0" appears in switch 620's configuration data 620 in both "vlan 1" and "vlan 3" interface blocks as required by policy 632, switch 616's configuration does not violate policy 632 (the "NO" prong of block 520). As there are no more switches to evaluate in light of policy 632 (the "NO" prong of block 528), processing in accordance with audit operation 500 terminates.

As used herein, to "log" or "record" a policy violation can mean to generate a console message at one or more computer displays, a log entry in a conventional "flat" file or to make (or cause to be made) an entry in a database used to track such activity. In other embodiments, a message may be generated and transmitted to one or more system/network administrators or other individuals. The message may comprise, for example, an email message, a text message or a telephone (i.e., voice) message.

Various changes in the materials, components, circuit elements, as well as in the details of the illustrated operational methods are possible without departing from the scope of the following claims. For example, one or more operations in accordance with FIGS. 1 and 5 may be combined into a single operation. That is, a single policy may identify and operate on multiple domains within a single device configuration file. In such cases, act in accordance with FIGS. 1 and 5 may process each endpoint's configuration information in toto before moving to, and evaluating, domains in a subsequent endpoint's configuration information. Similarly, a single identified act may be broken into two or more steps. For instance, access to topology database 108 may be made once during operations in accordance with FIGS. 1 and 5 rather than the multiple times indicated in this disclosure. It will also be recognized that acts in accordance with blocks 120, 156 and 516 may be performed by obtaining the requisite configuration data directly from the target device or from a different entity such as a configuration database or other configuration management system data store.

As previously noted, acts in accordance with FIGS. 1 and 5 may be performed by a programmable control device executing instructions organized into one or more program modules. A programmable control device (e.g., network devices 244, 248, 252 and 260) may include any programmable controller device including, for example, one or more members of the Intel Atom®, Core®, Pentium® and Celeron® processor families from Intel Corporation or a Solaris® workstation from Sun Microsystems. (INTEL, INTEL ATOM, CORE, PENTIUM, and CELERON are registered trademarks of the Intel Corporation. SOLARIS is a registered trademark of Sun Microsystems, Inc.) Custom designed state machines may be embodied in a hardware device such as an application specific integrated circuits (ASICs) and field programmable gate array (FPGAs).

Storage devices suitable for tangibly embodying program instructions (e.g., storage devices 232-240) include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A configuration change management method, comprising:
receiving a configuration policy, the configuration policy including at least one configuration data setting to be evaluated across a plurality of network devices, the plurality of network devices being topologically and functionally related, the plurality of network devices being coupled via a common network interface; and
evaluating each of the plurality of network devices against the configuration policy, the evaluation including:
identifying a network device of the plurality of network devices, the network device including configuration data corresponding to the configuration policy, the configuration data including the configuration data setting to be evaluated;
receiving a communication including the configuration data for the network device;
determining whether the at least one configuration data setting complies with the configuration policy based on:
content included in the communication,
at least one configuration data setting, and
a value for the at least one configuration data setting; and
upon determining that the at least one configuration data setting does not comply with the configuration policy,
generating a communication including a command for each of the at least one configuration data setting not complying with the configuration policy, wherein:
the command is configured to update the configuration of the network device to comply with the configuration policy, and
the command is configured to change the value for the at least one configuration data setting.

2. The method of claim 1, further comprising sending the script to the network device.

3. The method of claim 1, wherein the configuration policy specifies a configuration parameter value for a first network device in terms of a configuration parameter value for a second network device, the first network device and the second network device being included in the plurality of network devices.

4. The method of claim 1, wherein the identifying of the network device includes accessing a topology database.

5. The method of claim 4, wherein the accessing of the topology database includes accessing a relational database.

6. The method of claim 1, wherein the identifying of the network device includes reading entries in a topology database to identify a network device that matches one or more qualifying statements in the configuration policy.

7. The method of claim 1, wherein the obtaining of the configuration data for the network device includes requesting the configuration data directly from the network device.

8. The method of claim 1, further comprises repeating the evaluation of each of the plurality of network devices against the configuration policy until each of the plurality of network devices includes the at least one configuration data setting, and the at least one configuration data setting is set to the value.

9. A programmable storage device having programmed instructions stored thereon for causing a programmable control device to:

receive a configuration policy, the configuration policy including at least one configuration data setting to be evaluated across a plurality of network devices, the plurality of network devices being topologically and functionally related, the plurality of network devices being coupled via a common network interface; and evaluate each of the plurality of network devices against the configuration policy, the evaluation including:

identifying a network device in the plurality of network devices, the network device including configuration data corresponding to the configuration policy, the configuration data including the configuration data setting to be evaluated;

receiving a communication including the configuration data for the network device;

determining whether the at least one configuration data setting complies with the configuration policy based on:

content included in the communication, at least one configuration data setting, and a value for the at least one configuration data setting; and upon determining the at least one configuration data setting does not comply with the configuration policy, generating a communication including a command for each of the at least one configuration data setting not complying with the configuration policy, wherein:

the command is configured to update the configuration of the network device to comply with the configuration policy, and the command is configured to change the value for the at least one configuration data setting.

10. The programmable storage device of claim 9, wherein the programmed instructions stored thereon further cause the programmable control device to repeat the evaluation of each of the plurality of network devices against the configuration policy until each of the plurality of network devices include the at least one configuration data setting and the at least one configuration data setting is set to the value.

* * * * *